Feb. 5, 1929.
H. T. CROSSMAN
WEIGHING SCALE
Filed Oct. 24, 1924
1,701,031
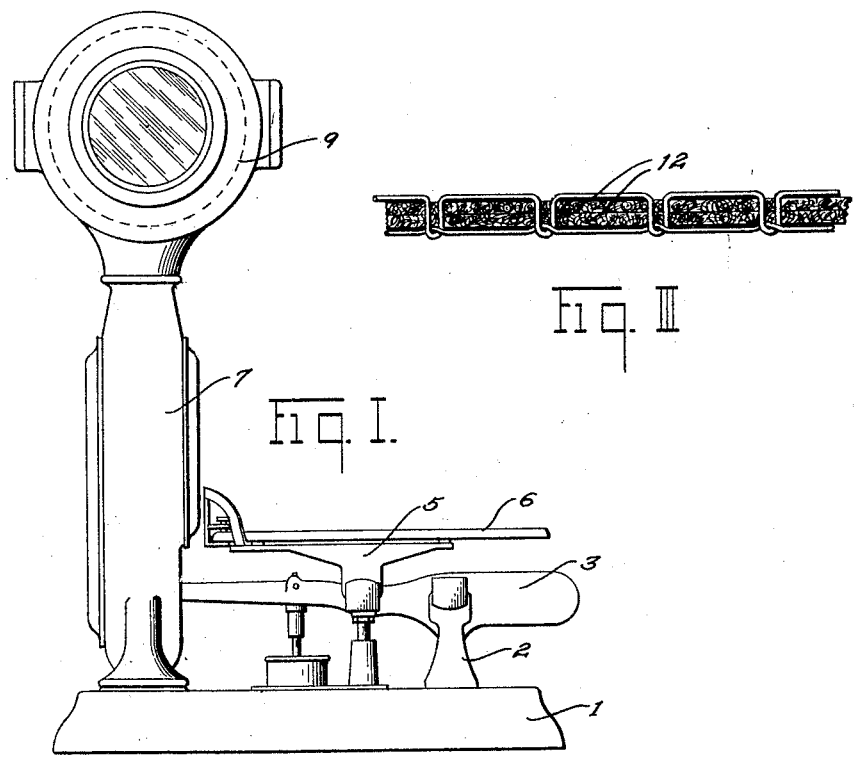
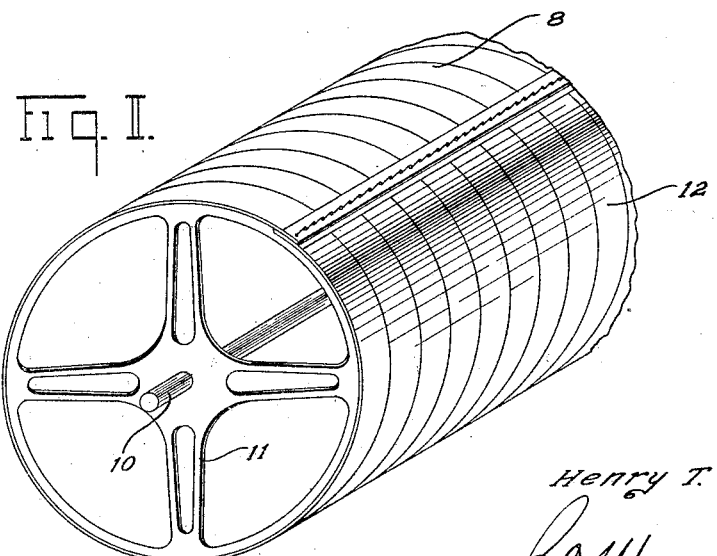
Inventor
Henry T. Crossman.
By C. D. Marshall
Attorney Patented Feb. 5, 1929.

1,701,031

UNITED STATES PATENT OFFICE.

HENRY T. CROSSMAN, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed October 24, 1924. Serial No. 745,613.

This invention relates to weighing scales, and particularly to the weight indicating and price computing charts for scales.

In the manufacture of weighing scales of the counter type more commonly known as computing cylinder scales, it is the practice to print the weight indicia and price computations upon comparatively long sheets of paper or other suitable material which are subsequently rolled into cylindrical form, the ends then overlapped and held together by glue or other adhering substance. With this method of securing the ends of the chart together, under unfavorable weather conditions the glue sometimes loosens up, and it is one of the principal objects of this invention to provide a more permanent means for securing the ends of the chart together.

Another object is the provision of a means for securing the ends of a chart together, which means is not affected by changes in temperature.

Another object is the provision of means for securing the ends of charts together which may be applied without the employment of skilled workmen.

Still another object is the provision of a simple and effective means for securing the ends of a chart together and which is inexpensive to apply.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a side elevational view of a weighing scale embodying my invention;

Figure II is an enlarged fragmentary isometric view of a chart per se embodying my invention; and Figure III is a greatly enlarged fragmentary sectional view illustrating the means of my invention for securing the ends of the chart together.

Referring to the drawings, I have illustrated my invention as incorporated in a weighing scale of the counter type, and as the scale forms no part of my invention per se it will only be described in such detail as to show the application of my device thereto.

The scale comprises a base 1 supporting at one end thereof a base horn or fulcrum stand 2 which supports the main lever 3. The lever 3 is provided with lever pivots supporting a spider 5 surmounted with a commodity receiving platform 6. The nose end of the load projecting into a housing 7 erected upon the base 1 is suitably connected to a pendulum load-counterbalancing mechanism (not shown). The lever is also connected by rack and pinion mechanism (not shown) to an indicating chart 8 supported upon anti-friction bearings carried in a substantially cylindrical casing 9 surmounting the housing 7.

The chart 8 consists of a shaft 10 upon which are fixed light spiders 11, preferably constructed of thin sheet metal, and a sheet of paper or cardboard 12 usually of about the thickness of two-ply bristol board which surrounds and is attached to the peripheries of the spiders 11. The paper 12 is of good quality and is preferably lacquered on both sides to preserve it and keep it from absorbing moisture. The edges of the strip of paper have in the past been fastened together by glue before the paper cylinder is slipped over the spiders, and in carrying out my invention I preferably retain this fastening means but in addition I sew the edges of the chart together, as indicated in Figures II and III. Any type of stitching may, of course, be used, and the ends may be either lapped, as shown in Figures II and III, or abutted together. When the ends are abutted together I prefer to reinforce the joint by attaching a narrow strip of paper along the joint on the inside of the chart so that the narrow strip is overlapped by both the abutting edges.

The embodiment of my invention herein shown and described is to be regarded as illustrative only, and it is to be understood that the invention is susceptible to variation, modification and change within the spirit and scope of the subjoined claim.

Having described my invention, I claim:

In a device of the class described, in combination, a supporting structure, and a sheet of thin material formed into a cylinder and surrounding and supported by said supporting structure, the edges of said sheet of material being overlapped and joined together by an adhesive and by stitching.

HENRY T. CROSSMAN.